3,146,221
COPOLYMERIC COMPOSITIONS
Gerald A. Lessells, Sharonville, and Pandurang M. Kamath, Madeira, Ohio, assignors to National Distillers and Chemical Corporation, New York, N.Y., a corporation of Virginia
No Drawing. Filed Nov. 25, 1960, Ser. No. 71,385
10 Claims. (Cl. 260—88.2)

This invention relates to a novel process for preparation of novel synthetic copolymeric compositions of improved characteristics and, particularly, an improved combination of properties including an improved combination of rheological characteristics. More particularly, the invention relates to a process for preparation of novel copolymers of an aliphatic monoolefin monomer and a di-phenyl-substituted alkadiene comonomer.

In accordance with the process aspects of this invention, a lower molecular weight ethylenically unsaturated aliphatic hydrocarbon is copolymerized with a di-phenyl-substituted alkadiene in the presence of a combination catalyst system, defined more fully hereinafter.

Particularly suitable as the lower molecular weight unsaturated aliphatic hydrocarbon monomer are the monoolefinic aliphatic hydrocarbons such as ethylene and propylene. The process, however, is not limited to these, being equally applicable to butene, isobutylene, and others.

The comonomer for copolymerization with the aforesaid aliphatically unsaturated hydrocarbon monomer is a di-phenyl-substituted alkadiene hydrocarbon and more specifically such hydrocarbons in which the alkadiene group is unconjugated. Examples thereof include 4,7-diphenyldecadiene-1,9, 4,7-dimethyl-4,7-diphenyl decadiene-1,9, 4,7-di(2-methylphenyl)decadiene-1,9, and the like.

In general, the catalyst employed for carrying out the stated copolymerization contains, as essential components, (a) a reducing agent (herein termed cocatalyst) as, for example, an element from Groups I to III inclusive of the Periodic Table, a metal alkyl, a metal alkyl hydride, a metal alkyl halide, and so forth, and mixtures of these, and (b) a halide of a transition metal from Groups IV, V, and VI of the Periodic Table. The combination catalyst is generally used in an amount of from about 0.01 to about 2.0 percent, based on the weight of the monomeric reactants subjected to the copolymerization. Regarding the relative proportions of the reducing agent to the transition metal halide in the combination catalyst, said catalyst generally comprises one mole of the transition metal halide to form about 0.25 to about 15 moles of the reducing agent.

In further reference to the combination catalyst system, specific examples of the cocatalyst component, i.e., the reducing agent, include the elements such as sodium, lithium, magnesium, aluminum, zinc, etc.; metal alkyls such as triethylaluminum, triisobutylaluminum, dibutylmagnesium, methyldihexylaluminum, dibutylcadmium, diethylzinc, n-butyllithium; metal alkyl hydrides such as diethylaluminum hydride, lithium aluminum hydride, dibutylaluminum hydride, butylmagnesium hydride, including such hydrides normally present in the aluminum alkyls; and metal alkyl halides such as the "sesquichlorides" which are mixtures of alkylaluminumdichloride and dialkylaluminumchloride, diethylaluminum chloride, butylmagnesiumchloride, dibutylaluminumiodide, and others.

The other component of the combination catalyst, namely a halide-containing compound of the aforesaid transition metals, is generally a chloride thereof, although other halides such as the bromides, iodides, etc., may be used. Of such metals, the halides of titanium, vanadium, and molybdenum are preferred, but halides of other metals, such as those of niobium, zirconium, tungsten, and others, may also be used. Also useful are metal subhalides prepared by treating the higher halide of the metal with a reducing agent, as, for example, aluminum and hydrogen. For example, titanium tetrachloride may be reduced by treating it with aluminum at a temperature between about 200° and 700° C. to produce a complex mixture of $TiCl_3$ and $AlCl_3$. More specific examples of halides of the aforesaid transition metals useful for practice of this invention include $TiCl_4$, $TiCl_3$, $3TiCl_3 \cdot AlCl_3$, $CVl_4$, $VOCl_3$, $NbCl_5$, $ZrCl_4$, $MoO_2Cl_2$ and mixtures thereof.

More specific examples of the combination catalyst embodied for use herein include triethylaluminum with titanium tetrachloride, triisobutylaluminum with complexed $3TiCl_3 \cdot AlCl_3$, triethylaluminum with $H_2$-reduced $TiCl_3$, and triethylaluminum with vanadium tetrachloride.

Although, as aforesaid, the catalysts embodied for use herein comprise a reducing agent and a halide-containing compound of the aforesaid transition metal, such catalysts can also contain additional ingredients. Thus, for example, such catalysts may contain a combination of a halide of such a transition metal and an oxyhalide of the aforesaid transition metals, e.g., $VOCl_3$, and, in further example, in combination with vanadium tetrachloride or titanium tetrachloride along with a reducing agent.

The copolymerization of the aforesaid reactants can be carried out over a wide range of temperatures but preferably is carried out at from about 40° to about 260° C. at a pressure that may range from about atmospheric up to about 6000 p.s.i. or even higher, such as up to about 30,000 p.s.i.

Copolymers as embodied herein can be prepared by copolymerizing about one mole of the monoolefinic aliphatic hydrocarbon monomer with about 0.1 to about 15 moles percent of the alkadiene comonomer, with a more preferred embodiment being about one mole of the monomer per from about one to about ten moles percent of the comonomer.

In general, the copolymerization is carried out in the presence of a diluent or a liquid reaction medium that is inert with respect to the reactants and to the copolymer product. In some cases the use of such a medium that is a solvent for the copolymer product is not only desired but preferred. Thus substances such as aliphatic, aromatic, and alicyclic hydrocarbons; chlorinated hydrocarbons; and so forth, may be used, with specific examples being n-heptane, decahydronaphthalene (decalin), benzene, cyclohexane, $C_5$–$C_8$ saturated aliphatic petroleum fractions, chlorobenzene, and the like, and mixtures of these materials.

By practice of this invention, there is obtained a copolymer which has properties unexpectedly superior to those of an olefinic homopolymer, such as linear polyethylene. For example, and in general, the copolymers of this invention have, as compared to linear polyethylene, a desirable combination of lower tensile strength, lower structural stiffness, lower density, higher melt point, and higher tear strength. In addition, the copolymeric product produced by copolymerizing the aforesaid reactants is capable of being further reacted to provide highly desired products. For example, chlorine can be added to the double bonds of the copolymer, using conventional chlorination procedures, to yield a product which has flame-retardant properties. Also the copolymeric product can be cured, or cross-linked, to a resin which possesses excellent properties. Such a resin, for example, exhibits form stability above the pre-cured melt point. Preferably, the cross-linking is effected by thermal treatment, such as by heating the copolymer. The copolymer can be heated above its melt point, in which case cross-linking takes place rapidly, or at lower temperatures, in which case a more extended time is required. Other methods useful for cross-linking include the use of other energy sources such as ionizing radiation, ultrasonic vibrations, and so forth; treatment with acid catalysts; or treatment with free-radical initiators.

In order to describe the invention further, the following embodiments (Examples 1 to 8 and Example 11) are set forth for purposes of illustration and not limitation.

EXAMPLE 1

To 2700 parts of decalin at 125° C. sufficient triethylaluminum (cocatalyst) and titanium tetrachloride (catalyst) were added to provide a concentration of 0.16 gram per liter and a weight ratio of cocatalyst to catalyst of 1. Ten parts of 4,7-diphenyldecadiene-1,9 (comonomer) was added to the reactor, and ethylene was then supplied to the mixture on a demand basis to maintain a constant pressure of 60 mm. Hg gauge. After 48 minutes a moderately stiff copolymer was obtained which contained 6 weight percent of diphenyldecadiene. The copolymer melted at 135° C., had a tensile strength of 2500 p.s.i., and a flexural stiffness of 51,000 p.s.i.

EXAMPLE 2

The procedure of Example 1 was followed, except that the comonomer concentration in the feed was 0.7 volume percent. The copolymer obtained in 98 minutes had a comonomer concentration of 3 weight percent, a tensile strength of 2600 p.s.i., and a flexural stiffness of 59,000 p.s.i.

EXAMPLE 3

The procedure of Example 1 was repeated, except that the catalyst concentration was 0.96 gram per liter. The copolymer obtained in 100 minutes had a comonomer concentration of 4 weight percent, a tensile strength of 2600 p.s.i., a flexural stiffness of 64,000 p.s.i., and a Graves tear of 1.19 pounds per mil.

EXAMPLE 4

The procedure of Example 1 was repeated, except that 440 parts of decalin was used, the catalyst was $3TiCl_3 \cdot AlCl_3$, the cocatalyst was triisobutylaluminum, catalyst concentration was 0.10 gram per liter, and the weight ratio of cocatalyst to catalyst was 0.5. After 66 minutes a copolymer was obtained that had a comonomer concentration of 6 weight percent and a melting point of 160° C.

EXAMPLE 5

The procedure of Example 1 was repeated, except that 440 parts of decalin was used, the catalyst $3TiCl_3 \cdot AlCl_3$, the cocatalyst was triisobutylaluminum, the catalyst concentration was 0.10 gram per liter, and the cocatalyst to catalyst weight ratio was 1.25. A copolymer was obtained that had a comonomer concentration of 4 weight percent and a melting point of 155° C.

EXAMPLE 6

The procedure of Example 1 was repeated, except that 440 parts of decalin was used, the catalyst $3TiCl_3 \cdot AlCl_3$, the cocatalyst was triisobutylaluminum, the catalyst concentration was 0.10 gram per liter, and the weight ratio of cocatalyst to catalyst was 2.5. A copolymer was obtained that had a comonomer concentration of 4 weight percent and a melting point of 155° C.

EXAMPLE 7

The procedure of Example 1 was followed, except that 440 parts decalin was used and the catalyst was $TiCl_4$ saturated with $VCl_3$ at 25° C. After 150 minutes a copolymer was obtained which contained 13 weight percent of comonomer and melted at 155° C.

EXAMPLE 8

The procedure of Example 1 was followed, except that the catalyst concentration was 0.96 gram per liter and the comonomer concentration in the feed was 0.07 volume percent. The copolymer obtained had a comonomer concentration of about 0.5 weight percent and a Graves tear of 1.15 pounds per mil.

EXAMPLE 9

The procedure of Example 1 was followed, except that no comonomer was used. The resulting polymer had a melting point of 135° C., a tensile strength of 3600 p.s.i., and a flexural stiffness of 100,000 p.s.i.

EXAMPLE 10

The procedure of Example 1 was followed, except that no comonomer was used and the catalyst concentration was 0.96 gram per liter. The resulting polymer had a Graves tear of 0.91 pound per mil.

The following tabulation sets forth the data pertaining to Examples 1 through 8, plus data from two runs (Examples 9 and 10) which were made with no comonomer and are included for purposes of comparison with the runs using the comonomer embodied herein.

*Table*

| Example | Catalyst type | Cocatalyst type [a] | Catalyst concentration (gram per liter) | Cocatalyst/ catalyst weight ratio | Weight of solvent (grams) | Comonomer concentration in feed (volume percent) | Comonomer concentration in copolymer (weight percent) | Reaction time (minutes) | Tensile strength (p.s.i.) | Flexural stiffness (psi.) | Graves tear (pounds per mil) |
|---|---|---|---|---|---|---|---|---|---|---|---|
| 1 | $TiCl_4$ | TEA | 0.16 | 1 | 2,700 | 2 | 6 | 48 | 2,500 | 51,000 | |
| 2 | $TiCl_4$ | TEA | 0.16 | 1 | 2,700 | 0.7 | 3 | 98 | 2,600 | 59,000 | |
| 3 | $TiCl_4$ | TEA | 0.96 | 1 | 2,700 | 2 | 4 | 100 | 2,600 | 64,000 | 1.19 |
| 4 | $3TiCl_3 \cdot AlCl_3$ | TIA | 0.10 | 0.5 | 440 | 2 | 6 | 66 | | | |
| 5 | $3TiCl_3 \cdot AlCl_3$ | TIA | 0.10 | 1.25 | 440 | 2 | 4 | | | | |
| 6 | $3TiCl_3 \cdot AlCl_3$ | TIA | 0.10 | 2.5 | 440 | 2 | 4 | | | | |
| 7 | $TiCl_4$ [b] | TEA | 0.16 | 1 | 440 | 2 | 13 | 150 | | | |
| 8 | $TiCl_4$ | TEA | 0.96 | 1 | 2,700 | 0.07 | ~0.5 | | | | 1.15 |
| 9 | $TiCl_4$ | TEA | 0.16 | 1 | 2,700 | 0 | 0 | 18 | 3,600 | 100,000 | |
| 10 | $TiCl_4$ | TEA | 0.96 | 1 | 2,700 | 0 | 0 | 95 | | | 0.91 |

[a] TEA—triethylaluminum. TIA—triisobutylaluminum.
[b] Saturated with $VCl_3$ at 25° C.
Conditions:
  Temperature—125° C.
  Pressure—60 mm. Hg gauge.
  Monomer—Ethylene.
  Comonomer—4,7-diphenyldecadiene-1,9.
  Solvent—Decalin.

As is evidenced by the data in the foregoing tabulation, the copolymers embodied herein possess strength, stiffness, and tear characteristics which in general differ from those of homopolymers of ethylene. These properties make the copolymers of this invention particularly applicable for use in packaging bags, wire and cable coating, and squeeze bottle applications.

EXAMPLE 11

In a manner similar to the procedure described in Example 1, ethylene was copolymerized with 4,7-diphenyldecadiene-1,9, using two volume percent of the 4,7-diphenyldecadiene-1,9, a catalyst consisting of $3TiCl_3 \cdot AlCl_3$ and cocatalyst triisobutylaluminum in concentration of 0.10 gram per liter, and a cocatalyst to catalyst ratio of 2.5. A 35-gram batch of the resulting copolymer was milled in air at 150° C. for about two minutes to effect cross-linking. The resulting vulcanizate was compression-molded at 160° C. and showed form stability up to 100 centigrade degrees above the pre-cured melt point of about 145° C.

The cross-linked copolymers embodied herein, possessing improved melting point and form-stability characteristics, are particularly attractive for use as electric motor insulation, packing bags, pipe, and wire and cable coating.

While there are above disclosed but a limited number of embodiments of the invention herein presented, it is possible to produce still other embodiments without departing from the inventive concept thereof. It is desired, therefore, that only such limitations be imposed upon the appended claims as are stated therein.

What is claimed is:

1. A catalytic process which comprises copolymerizing a mixture of (a) a lower molecular weight monoolefinic aliphatic hydrocarbon monomer and (b) an alkadiene comonomer selected from the group consisting of 4,7-diphenyldecadiene-1,9; 4,7-dimethyl - 4,7 - diphenyl decadiene-1,9; and 4,7-di(2-methylphenyl)decadiene-1,9 in the presence of a combination polymerization catalyst comprising a reducing agent and a halide-containing compounds of a transition metal from the group consisting of Groups IV, V and VI of the Periodic Table to obtain a copolymer containing about 0.1 to 15 moles percent of said alkadiene.

2. The process of claim 1 wherein said monoolefinic hydrocarbon is ethylene.

3. The process of claim 1 wherein said alkadiene is 4,7-diphenyldecadiene-1,9.

4. The process of claim 1 wherein the combination catalyst is present in an amount of from about 0.01 to about 2.0 percent, based on the weight of the monomeric reactants, and the combination catalyst comprises one mole of the transition metal halide to from about 0.25 to about 15 moles of the reducing agent.

5. A catalytic process which comprises copolymerizing a mixture of ethylene and 4,7-di-phenyldecadiene-1,9 in the presence of a combination polymerization catalyst comprising trialkylaluminum and titanium tetrahalide in an amount from about 0.01 to about 2 percent, based on the weight of the monomeric reactants, to obtain a copolymer containing about 0.1 to 15 moles percent of the 4,7-diphenyldecadiene-1,9.

6. A catalytic process which comprises copolymerizing a mixture of ethylene and 4.7-diphenyldecadiene-1,9 in the presence of a combination polymerization catalyst comprising trialkylaluminum and a complex of $TiCl_3$ and $AlCl_3$ in an amount from about 0.01 to about 2 percent, based on the weight of the monomeric reactants, to obtain a copolymer containing about 0.1 to 15 moles percent of the 4,7-diphenyldecadiene-1,9.

7. A copolymer of a lower molecular weight monoolefinic aliphatic hydrocarbon monomer and about 0.1 to 15 moles percent of an alkadiene selected from the group consisting of 4,7-diphenyldecadiene-1,9, 4,7-dimethyl - 4,7 - diphenyldecadiene-1,9 and 4,7-di(2-methylphenyl)decadiene-1,9.

8. A copolymer of ethylene and about 0.1 to 15 moles percent 4,7-diphenyldecadiene-1,9.

9. A high-melting, cross-linked copolymer of a lower molecular weight monoolefinic aliphatic hydrocarbon monomer and about 0.1 to 15 moles percent of an alkadiene selected from the group consisting of 4,7-diphenyldecadiene-1,9; 4,7-dimethyl - 4,7 - diphenyldecadiene-1,9 and 4,7-di(2-methylphenyl)decadiene-1,9.

10. A high-melting, cross-linked copolymer of ethylene and about 0.1 to 15 moles percent 4,7-diphenyldecadiene-1,9.

References Cited in the file of this patent

UNITED STATES PATENTS

| | | |
|---|---|---|
| 2,976,268 | Milford et al. | Mar. 21, 1961 |
| 2,962,488 | Horne | Nov. 29, 1960 |

FOREIGN PATENTS

| | | |
|---|---|---|
| 776,326 | Great Britain | June 5, 1957 |